July 28, 1959  E. L. NORTHUP  2,896,904
GATE VALVE
Filed Nov. 13, 1956  3 Sheets-Sheet 1
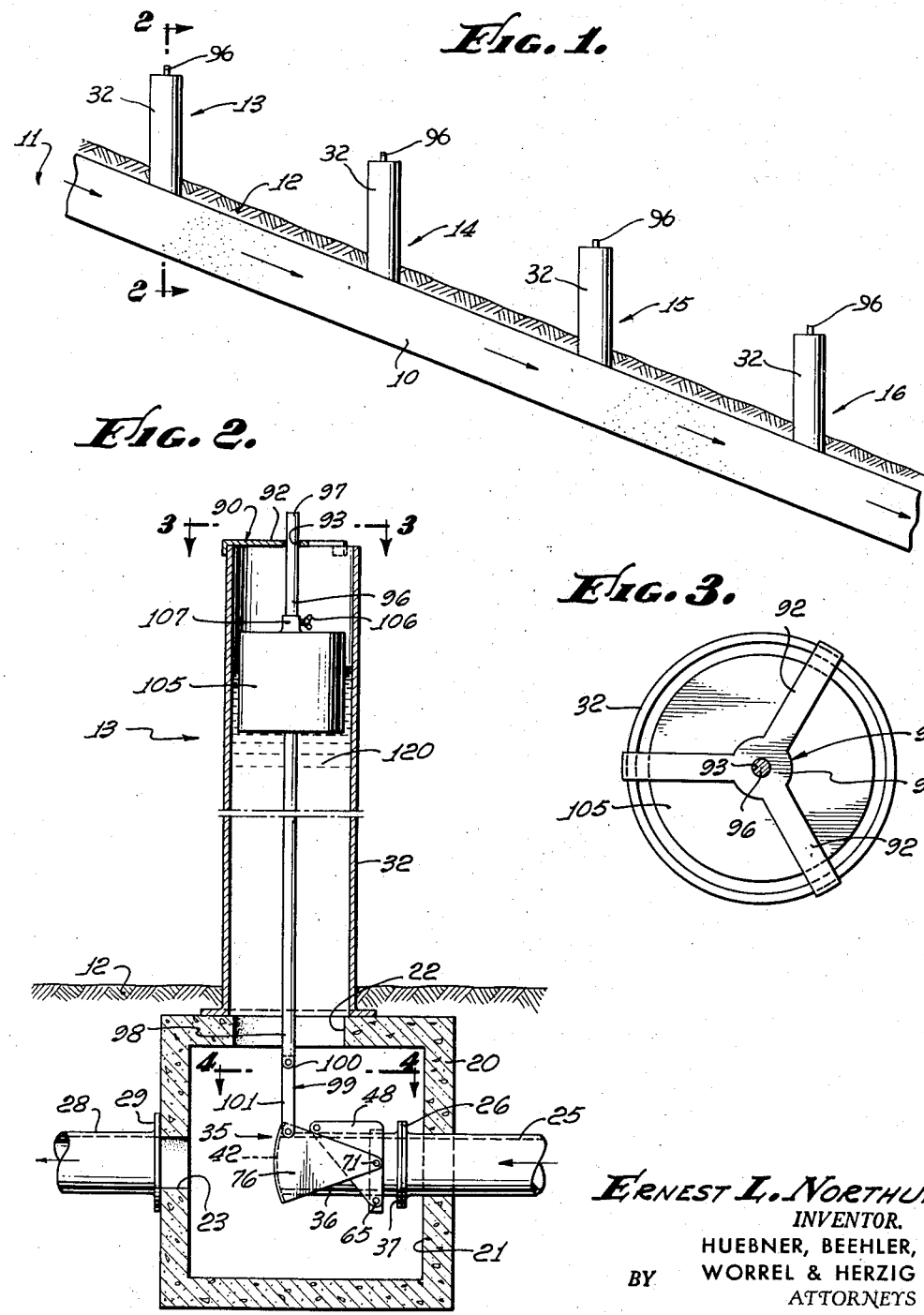
ERNEST L. NORTHUP
INVENTOR.
BY HUEBNER, BEEHLER,
WORREL & HERZIG
ATTORNEYS
BY Richard M. Worrel

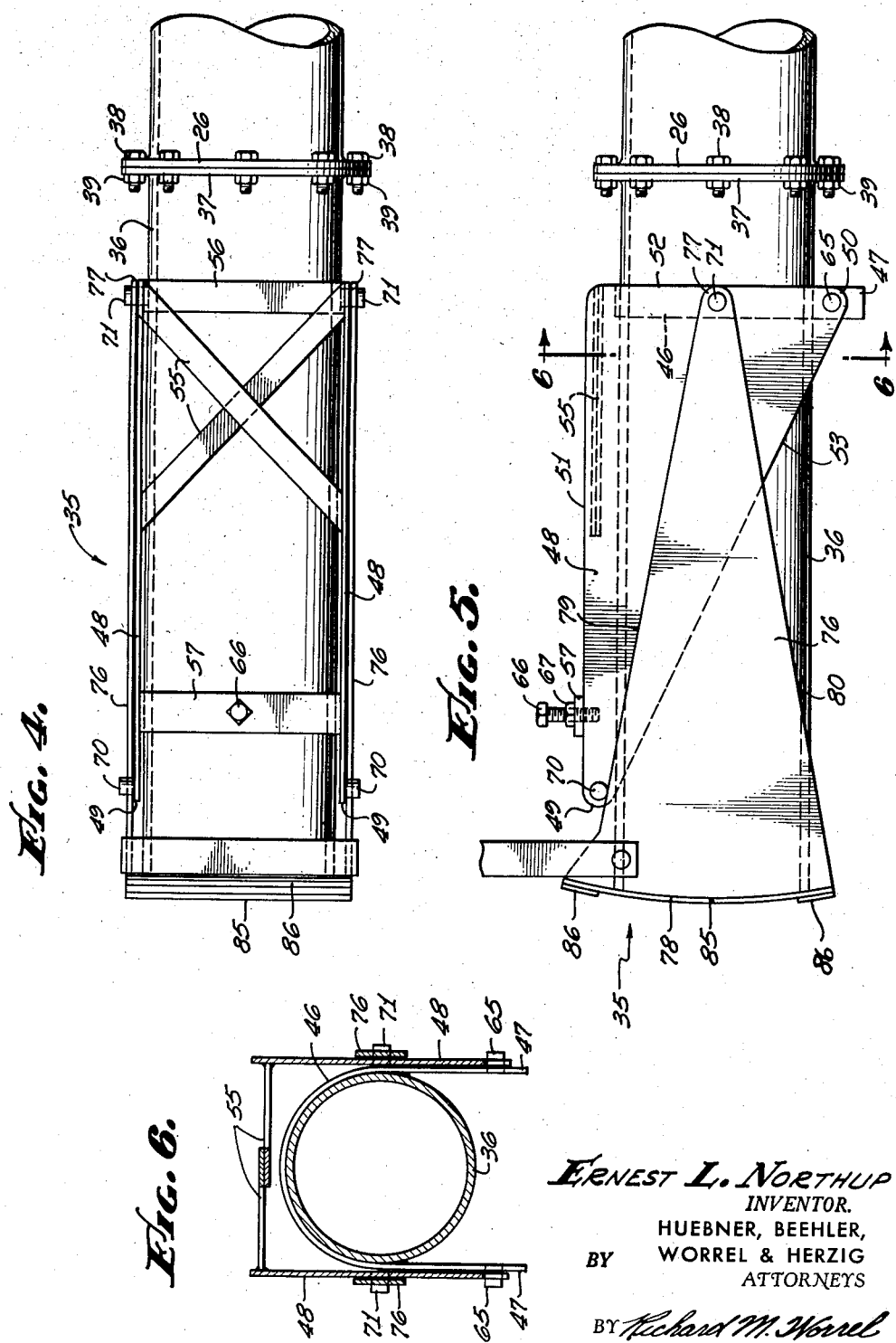

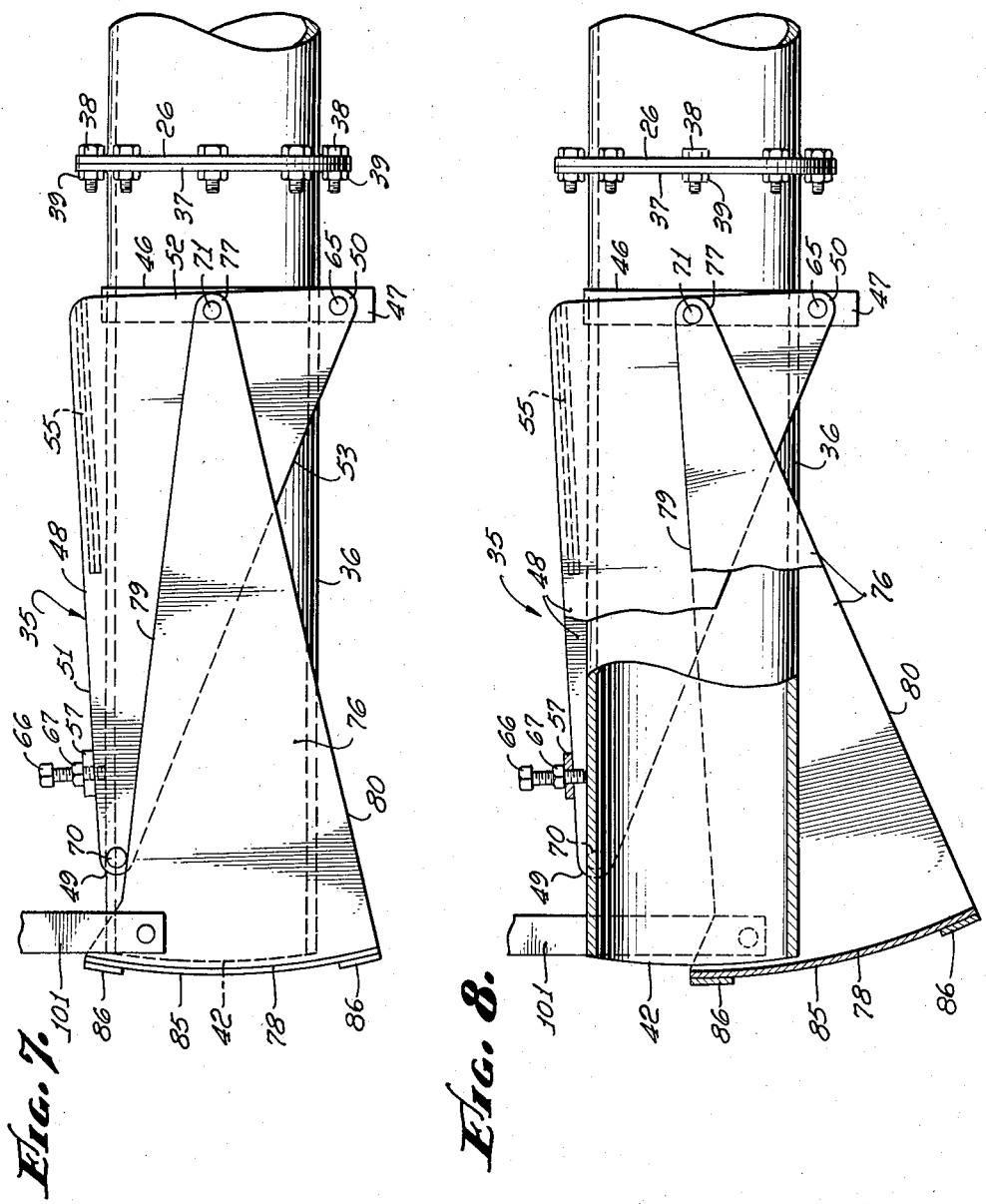

United States Patent Office 2,896,904
Patented July 28, 1959

2,896,904

GATE VALVE

Ernest L. Northup, Porterville, Calif.

Application November 13, 1956, Serial No. 621,910

6 Claims. (Cl. 251—147)

The present invention relates to irrigation systems and more particularly to an improved gate valve having special advantage in such systems.

The problems of control of gravity flow irrigation water are largely the same whether the irrigation system be of vast size distributing water through hundreds of miles of conduit or confined to a small farm in which the conduits supply water to rows of trees or the like. The conduits must descend in the intended direction of water flow sufficiently to insure the desired flow rate. Such descent makes it difficult to insure substantially constant water head pressure throughout the length of the conduit. For example, such a descending conduit devoid of water control gates spaced therealong is only able to deliver water at its lower end in dependable volume. Since it is equally necessary to be able to obtain water from the conduit at its higher end, it is the practice to provide gate valves at periodic intervals along the conduit. Intermediate the gate valve's lateral discharge conduits are extended from the main conduit and are usually provided with independently operable discharge valves.

Heretofore in such systems, it has been the practice partially or fully to close the gate valve immediately downwardly adjacent to any lateral conduit from which it was desired to take water. This, of course, resulted in a disturbance of the water supply downwardly of the main conduit from the gate valve which was closed. When sufficient water had been taken from the lateral conduit, it was the practice to open the gate valve in order otherwise to dispose of the water. This too resulted in a disturbance of the adjusted water flow downwardly of the conduit. As a result, it is the usual practice to re-regulate all of the gate valves spaced along the main conduit whenever the flow of water from one or more of the lateral conduits is modified. This has proved an onerous and time consuming task and one involving considerable expense where the length of the main conduit is substantial.

It is an object of the present invention, therefore, to provide an improved irrigation system obviating the described need for gate valve re-adjustment upon modification of the water flow from any of the lateral conduits.

Another object is to provide an irrigation system in which the water pressure or head pressure at each position of water withdrawal is automatically regulated to maintain a predetermined standard whenever sufficient water is available and independent of variations in water withdrawal.

In order to achieve the foregoing objectives, it has been found necessary to provide an improved gate valve inasmuch as those previously available were not fully suited to the problem. Since gate valves quite generally provide frictional engagement between valve plates and valve seats in moving between open and closed positions, they have not been readily adapted to independent automatic operation, have been subject to excessive wear and deterioration, and have been of greater construction cost and maintenance expense than desired.

A further object of the present invention is to provide an improved gate valve.

Another object is to provide a gate valve avoiding the described frictional engagement between valve plates and valve seats.

Another object is to provide a gate valve having a valve seat and a valve plate with associated structure for moving the valve plate to and from valve seat engagement with a minimum of relative slidable movement and frictional contact.

Another object is to provide an automatic gate valve characterized by a greater freedom of operation than previously attainable.

These and other objects and advantages will become more fully apparent in the subsequent description in the specification.

In the drawings:

Fig. 1 is a diagrammatic, fragmentary side elevation of an irrigation system in which the gate valve of the subject invention is advantageously employed.

Fig. 2 is a somewhat enlarged, fragmentary vertical section taken at a position represented by line 2—2 of Fig. 1.

Fig. 3 is a horizontal section taken at a position represented by line 3—3 of Fig. 2.

Fig. 4 is a somewhat enlarged horizontal section taken on a plane at a position represented by line 4—4 of Fig. 2.

Fig. 5 is a side elevation of the structure shown in Fig. 4 and illustrates the gate valve in closed position.

Fig. 6 is a transverse cross section taken on line 6—6 of Fig. 5.

Fig. 7 is a view similar to Fig. 5 and illustrates the gate valve in an intermediate position between closed and open positions.

Fig. 8 is a view similar to Fig. 5 but illustrates the gate valve in partially open position.

Referring more particularly to the accompanying drawings, the irrigation system is illustrated in Fig. 1 as including an irrigation main conduit or duct 10 connected to a source of water, not shown, but having a relative position generally indicated by the numeral 11. The conduit may constitute an open ditch or a cylindrical tube in the ground 12 and is frequently many miles in length. The system also includes a plurality of irrigation control stations 13, 14, 15, and 16 longitudinally spaced at intervals along the conduit. As will be seen, water is delivered through the conduit from the source in the direction of the arrows to the various stations each of which is at a successively lower elevation, and water is controllably released through lateral conduits, not shown, intermediate the stations for irrigation or other purposes. For example, in large irrigation systems, outlet conduits are provided between the stations and frequently each provides the irrigation water for an entire farming community.

Considering the installation at one of the stations 13, 14, 15, or 16, the conduit 10 includes a vault 20 which provides a fluid chamber 21, a standpipe opening 22, and an outlet opening 23. The conduit also includes an inlet portion 25 mounted in the vault in fluid communication with the chamber for delivering water to the chamber. The end of the conduit within the chamber provides an annular flange 26. The conduit further includes an outlet portion 28 which has a flange 29 secured to the vault around the outlet opening so that the outlet portion is also in fluid communication with the chamber for releasing water from the chamber. An elongated, cylindrical, concrete standpipe 32 is supported on the vault in upstanding position and has a flange around the standpipe opening so that the chamber 21 is in fluid communication with the standpipe.

The gate valve of the present invention is generally indicated by the numeral 35 and includes a cylindrical adapter pipe 36 having an annular flange 37 secured to the flange 26 by bolts 38 and nuts 39. The pipe is thus coaxially extended from the end of the inlet portion 25 within the chamber 21. The pipe has a transverse, endwardly disposed, convex valve seat 42 which, for descriptive convenience, is considered to be at the forward end of the pipe.

With particular reference to Figs. 5 and 6, an inverted, U-shaped bracket 46 is supported on the pipe 36 rearwardly of the valve seat 42 and provides dependent mounting arms 47 spaced from each other on opposite sides of the pipe. The bracket is, of course, rigidly secured to the pipe. A pair of triangular, auxiliary support plates 48 provide upper forward apices 49, lower rear apices 50, top edges 51, rear edges 52, and hypotenuse edges 53. The auxiliary plates are rigidly interconnected in spaced parallel relation, as best seen in Figs. 4 and 6, by crossed braces 55, a rear transverse strut 56, and a front transverse bar 57. It is to be noted that the auxiliary plates are spaced apart a distance slightly greater than the diameter of the adapter pipe and that corresponding edges of the plates lie in common planes.

The auxiliary support plates 48 are positioned on opposite sides of the adapter pipe 36 and lower pivot pins 65 pivotally connect the lower rear apices 50 individually to the dependent mounting arms 47. It is to be noted that the pivot pins lie on a common axis eccentrically of the valve seat 42. The auxiliary support plates are thus mounted for elevational pivotal movement relative to the pipe 36 about an axis right angularly related to the longitudinal axis of the pipe and spaced therefrom. A threaded stop bolt 66 is screw-threadably extended downwardly through the front bar 57 for engaging the pipe to limit downward gravitational pivoting of the auxiliary plates. A lock nut 67 is screw-threaded on the bolt above the front bar for mounting the bolt in selectively adjusted positions.

For a purpose to be described, limit studs or stops 70 are outwardly extended from the upper forward apices 49 of the auxiliary support plates 48 and lie on a common axis. Also, coaxial trunnions 71 are outwardly extended from the auxiliary plates along the rear edges 52 thereof and approximately midway between the lower rear apices and the corners of the auxiliary plates defined where the top and rear edges 51 and 52 meet each other. The trunnions are spaced from the pivot pins 65 toward the longitudinal axis of the pipe, and as will subsequently become apparent, are in substantially the same plane as the longitudinal axis of the pipe when the valve is closed. It will also be noted that the trunnions are parallel to the pins and right angularly related to said longitudinal axis.

A pair of similar, main support plates 76 of generally isosceles triangular form provide rear apices 77, convex forward edges 78, and top and bottom edges 79 and 80, respectively, convergently tapering from the forward edges to the rear apices. The main support plates 76 are rigidly interconnected in spaced parallel relation with corresponding edges in common planes by a convex valve plate 85 secured to the forward edges 78 transversely of the main plates. It is to be noted at this point that the valve plate is adapted complementarily to fit in fluid-tight engagement against the valve seat 42. Reinforcing bars 86 are secured to the valve plate along the upper and lower edges thereof. The main plates are spaced far enough apart so as to be positioned on opposite sides of the pipe 36 outwardly of the auxiliary support plates 48. The apices 77 of the main support plates are journaled on the trunnions 71 for pivotal movement of the valve plate around the trunnions as an axis. The valve plate is concentric to the trunnions when mounted in this manner. The limit studs 70 are adapted to abut the top edges 79 of the main support plates in certain positions of the main and auxiliary support plates, as will be seen hereinafter.

A yoke 90 includes a hub 91 and a plurality of radially extended support legs 92 rested on the upper end of the standpipe 32 having downturned flanges outwardly of the standpipe. The hub is thus held centrally of the standpipe and provides a bore 93 concentric to the standpipe.

An elongated bail control stem 96 provides an upper end 97 slidably extended through the bore 93 in the yoke 90 and a lower end 98. An inverted U-shaped bail 99 provides a central portion 100 pivotally connected to the lower end of the stem and a pair of downwardly extended legs 101 individually pivotally connected to the main support plates 76 adjacent to the upper edge of the valve plate 85.

A substantially cylindrical float 105 is axially slidably mounted on the control stem 96. A lock bolt 106 is screw-threadably connected through a neck 107 on the float for releasable engagement with the stem and for slidable adjustment of the float on the stem. The control stem 96, the bail 99, and the float 105 constitute control means for opening and closing the valve plate 85. It is to be understood that although this automatic means is preferred, the valve plate can be opened and closed manually or by any other desired means.

*Operation*

The operation of the described embodiment of the subject invention is briefly summarized at this point. The operation of the gate valve 35 itself will be initially considered and thereafter, the operation of an irrigation system, such as that indicated in Fig. 1, employing the subject gate valve will be explained.

Let it be assumed that water 120 fills the chamber 21 and rises into the standpipe 32 so as to buoy the float 105 on the water in the standpipe. Further, let it be assumed that the float, through the stem 96 and bail 99, holds the valve plate 85 in closed position over the valve seat 42, as indicated in Fig. 2. At this time, the trunnions 71 are coaxial with the axis of the valve seat and the limit studs 70 rest on the edges 79 of the main support plate 76. The trunnions are also in substantially radial relation to the longitudinal axis of the adapter pipe 36. It is to be observed that it would be extremely difficult to pivot the main support plates and the valve plate around the trunnions when the latter are in the described position of concentricity with the valve seat.

If water is released through the outlet portion 28 of the conduit 10, the level of the water in the standpipe 32 drops. Depending on the initial adjustment of the float 105 on the stem 96, when the water drops below a predetermined level, it permits the main and auxiliary support plates 76 and 49, respectively, to pivot gravitationally downwardly. The auxiliary support plates pivot around the lower pivot pins 65 to move the trunnions 71 in an arc from their initial positions of concentricity to the valve seat 42 to positions eccentric to the valve seat. This movement of the trunnions downwardly and forwardly toward the valve seat moves the valve plate endwardly to a predetermined position away from the valve seat 42. When the valve plate is out of contact with the valve seat, it pivots downwardly around the trunnions.

The action of the gate valve 35 in moving from closed to open position is shown in Figs. 5, 7, and 8. In Fig. 5, the valve is closed. In Fig. 7, the water in the standpipe 32 has dropped and the auxiliary support plates 48 have pivoted downwardly an amount sufficient to move the valve plate 85 slightly outwardly to a predetermined position from the valve seat 42. In Fig. 8, the stop bolt 66 has engaged the adapter pipe 36 to limit further downward pivoting of the auxiliary plates. However, the main support plates 76 and the valve plate have pivoted around the trunnions 71 so as partially to open the valve seat. Depending on how much the water level drops in the standpipe, the valve plate will either partially or completely uncover the valve seat.

As more water flows into the chamber 21 and upwardly into the standpipe 32 by reason of opening the valve seat 42, the float 105 will start to rise once again. This pulls upwardly on the stem 96 and bail 99 to pivot the valve plate 85 and main support plates 76 upwardly. The illustration in Fig. 8 might also be regarded as showing the gate valve at this stage of its operation. When the main plates reach the position shown in Fig. 7, the top edges 79 abut the limit studs 70 so that further elevational movement of the float 105 pivots the auxiliary plates 48 upwardly. As the auxiliary plates move upwardly, the trunnions 71, or the pivot axis for the valve plate 85, are moved upwardly and rearwardly relative to the valve seat. Continued movement in this manner brings the valve plate axially against the valve seat when the trunnions are once again in positions concentric to the valve seat, as shown in Figs. 2 and 5.

It will be evident that the valve plate 85 and valve seat 42 do not experience any relative sliding or rotating movement so as to abrade or wear their contacting surfaces. This clearly increases the life of the gate valve and provides a more dependable fluid-tight seal inasmuch as leakage through wear is minimized. It is evident that gaskets or other types of packing are unnecessary thereby resulting in additional economies.

When the gate valve 35 of the present invention is employed in the irrigation system of Fig. 1, for example, it effects improved control of the water supply and availability. Thus it is noted that the gate valve is employed on the high-pressure side or inlet portions 25 of the conduit 10 which lead into the chambers 21. When water is released from the outlet portions 28 below station 16, for example, the float 105 at station 16 drops to open the valve and to emit more water. In turn, this causes the float at station 15 to drop whereupon the valve at such station also opens. It will be evident that this action successively takes place throughout the entire system with the final result that more water from the source 11 is introduced into the conduit 10 to maintain an even flow and to stabilize the available water throughout the system.

From the foregoing it will be evident that a gate valve has been provided which effects an improved, dependable fluid-tight seal, which is economical and simple to construct and operate, and which, when employed in an irrigation system, enables the maintenance of a susbtantially uniform water supply throughout the system.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A gate valve comprising a conduit having an opening circumscribed by a valve seat having an axis of reference normal to the seat and centrally thereof; an auxiliary support mounted for pivotal movement about an axis spaced from the seat in the direction of the conduit therefrom, said pivot axis being right-angularly related to the reference axis and laterally spaced from the reference axis, the auxiliary support being extended transversely of said reference axis and being pivotal toward and from the valve seat, said auxiliary support being pivotally urged in a direction toward the valve seat; means limiting pivotal movement of the auxiliary support toward the valve seat; a main support mounted on the auxiliary support in spaced relation to the pivot axis of the auxiliary support for pivotal movement about an axis parallel to said pivot axis of the auxiliary support, a valve plate borne by the main support for sealingly engaging the valve seat, the main support being pivoted between a predetermined valve position in which the valve is in alignment with and spaced axially from the valve seat and an open position in which the valve plate is spaced laterally from the valve seat, coacting means establishing contact between the main support and the auxiliary support upon movement of the main support about its axis from open position to said predetermined valve position, the pivotal arrangement of said supports in conjunction with said coacting means being such that upon continued movement of the main support beyond said predetermined valve position a unitary movement of the main support and auxiliary support about the auxiliary support axis will be effected to move the valve plate substantially axially into sealing engagement with the valve seat; upon movement of the valve plate from engagement with the valve seat the main support and auxiliary support pivot as a unitary member about the auxiliary support axis to move the valve plate substantially axially to the predetermined valve position wherein said auxiliary support is stopped by said limiting means and continued movement moves said main support about its axis to open position, and operating means attached to the main support.

2. A gate valve comprising a conduit having a longitudinal axis and providing an open end, a valve plate adapted to seat against the open end, a pair of auxiliary members mounted for pivotal movement about a common axis disposed transversely of the longitudinal axis of the conduit and laterally spaced from said longitudinal axis, the auxiliary members being extended on opposite sides of the conduit transversely of the conduit for pivotal movement toward and from the open end of the conduit, said auxiliary members being pivotally urged in a direction toward the open end of the conduit, limiting means for limiting pivotal movement of said auxiliary members, a pair of main support members positioned on opposite sides of the conduit and individually pivotally mounted on the auxiliary members on a common axis substantially parallel to the pivot axis of the auxiliary members for pivotal movement transversely of the conduit, said main support members being extended along opposite sides of the conduit and mounting the valve plate therebetween, the main support members being pivoted between a predetermined valve position in which the valve is in alignment with and spaced axially from the valve seat and an open position in which the valve plate is spaced laterally from the valve seat, coacting stop means establishing contact between the main support members and the auxiliary members upon movement of the main support members about their axis from open position to said predetermined valve position, the pivotal arrangement of said members in conjunction with said coacting stop means being such that upon continued movement of the main support members beyond said predetermined valve position a unitary movement of the main support members and auxiliary members about the auxiliary member axis will be effected to move the valve plate substantially axially into sealing engagement with the valve seat; upon movement of the valve plate from engagement with the valves at the main support members and auxiliary members pivot as a unitary member about the auxiliary support member axis to move the valve plate substantially axially to the predetermined valve position wherein said auxiliary members are stopped by said limiting means and continued movement moves said main support members about their axis to open position, and operating means attached to the main support members.

3. A gate valve as set forth in claim 2 in which the open end of the conduit is arcuately convex, the valve plate is complementarily fitted to said open end, and the pivot axis of the main support members is concentric to the open end of the conduit when the valve plate is in closed position.

4. A gate valve comprising a conduit providing a valve seat which has an axis of reference substantially normal to the seat and concentrically thereof; a pair of auxiliary members disposed on opposite sides of the conduit; means mounting the auxiliary members for pivotal movement about a substantially common axis in spaced relation to both the valve seat and the axis of reference thereof and substantially right-angularly related to said axis of reference for movement toward and from the valve seat, said auxiliary members being pivotally urged in a direction toward the valve seat; limiting means operably associated with the auxiliary members limiting pivotal movement thereof toward the valve seat; a pair of valve plate support members disposed on opposite sides of the conduit individually pivotally mounted on the auxiliary members for pivotal movement about substantially aligned axes parallel to the pivot axis of the auxiliary members and in a plane substantially common to the reference axis of the valve seat, the support members being extended on opposite sides of the valve seat for pivotal movement transversely thereof, a valve plate borne by the support members for sealingly engaging the valve seat, the support members being pivoted between a predetermined valve position in which the valve is in alignment with and spaced axially from the valve seat and an open position in which the valve plate is spaced laterally from the valve seat, coacting means establishing contact between the support members and the auxiliary members upon movement of the support members about their axis from open position to said predetermined valve position, the pivotal arrangement of said members in conjunction with said coacting means being such that upon continued movement of the support member beyond said predetermined valve position a unitary movement of the support members and auxiliary members about the auxiliary member axis will be effected to move the valve plate substantially axially into sealing engagement with the valve seat; upon movement of the valve plate from engagement with the valve seat the support members and auxiliary members pivot as a unitary member about the auxiliary member axis to move the valve plate substantially axially to the predetermined valve position wherein said auxiliary members are stopped by said limiting means and continued movement moves said support members about their axis to open position, and operating means attached to the main support.

5. A gate valve comprising a substantially horizontal conduit having an open end providing a valve seat having an axis of reference substantially normal to the seat and centrally thereof; an auxiliary member mounted for pivotal movement about an axis right-angularly related to the reference axis, downwardly spaced from the reference axis and spaced from the seat in the direction of the conduit therefrom and said auxiliary member being upwardly extended on opposite sides of the reference axis for pivotal movement along the conduit toward and from the seat, said auxiliary support being pivotally urged in a direction toward the valve seat; a stop limiting pivotal movement of the auxiliary member toward the seat; a support member pivotally mounted on the auxiliary member for movement about an axis parallel to that of the auxiliary member and spaced above the auxiliary member axis; a valve plate borne by the support member for sealingly engaging the valve seat and for pivotal movement therewith, the support member being pivoted between a predetermined valve position in which the valve is in alignment with and spaced axially from the valve seat and an open position in which the valve plate is spaced laterally downwardly from the valve seat, coacting stop means establishing contact between the support member and the auxiliary member upon movement of the support member about its axis from open position to said predetermined valve position, the pivotal arrangement of said members in conjunction with said coacting stop means being such that upon continued movement of the support member beyond said predetermined valve position a unitary movement of the support member and auxiliary member about the auxiliary member axis will be effected to move the valve plate substantially axially toward and into sealing engagement with the valve seat; upon movement of the valve plate from engagement with the valve seat the support member and auxiliary member pivot as a unitary member about the auxiliary member axis to move the valve plate substantially axially to the predetermined valve position wherein said support member is free to move about its axis, independently of said auxiliary member, to open position and operating means attached to the support member.

6. A gate valve comprising a pipe having a longitudinal axis and an open end providing a valve seat; spaced substantially parallel, auxiliary support plates pivotally connected to the pipe on the opposite sides of the pipe on a common axis transversely spaced from the longitudinal axis of the pipe, said auxiliary support plates being extended transversely of the pipe for pivotal movement longitudinally thereof; coaxial trunnions outwardly extended from the auxiliary plates in substantially right-angular relation to the pipe axis and spaced from the valve seat longitudinally of the pipe; main support plates having ends pivotally journaled on the trunnions and opposite ends disposed on the opposite sides of the valve seat for pivotal movement transversely of the pipe; a valve plate interconnecting the main plates adjacent to the end of the pipe and adapted to seat against the valve seat, the auxiliary plates being pivotal away from the valve seat to a valve closing position with the trunnions in substantially the same plane as said longitudinal axis and in spaced relation to the valve seat and being pivotal toward the valve seat to a valve opening position with the trunnions in more closely spaced relation to the valve seat than when the auxiliary plates are in valve closing position, said auxiliary plates being pivotally urged in a direction toward the valve seat; stop means coacting between the auxiliary plates and the pipe limiting pivotal movement of the auxiliary plates toward the valve seat, the main plates being pivoted between a predetermined valve position in which the valve is in alignment with and spaced axially from the valve seat and an open position in which the valve plate is spaced laterally from the valve seat, coacting means establishing contact between the main plates and the auxiliary plates upon movement of the main plates about their axis from open position to said predetermined valve position, the pivotal arrangement of said plates in conjunction with said coacting means being such that upon continued movement of the main plates beyond said predetermined valve position a unitary movement of the main plates and auxiliary plates about the auxiliary support axis will be effected to move the valve plate substantially axially into sealing engagement with the valve seat; upon movement of the valve plate from engagement with the valve seat the main plates and auxiliary plates pivot as a unitary member about the auxiliary plate axis to move the valve plate substantially axially to the predetermined valve position wherein said auxiliary plate is stopped by said stop means and continued movement moves said main plates about their axis to open position, and operating means attached to the main support.

References Cited in the file of this patent
UNITED STATES PATENTS

| 845,260 | Raphiel | Feb. 26, 1907 |
| 1,041,509 | Petrie | Oct. 15, 1912 |
| 1,818,422 | Motsinger | Aug. 11, 1931 |
| 2,362,747 | Duke | Nov. 14, 1944 |